No. 788,316. PATENTED APR. 25, 1905.
T. W. HOWARD.
GATE.
APPLICATION FILED MAR. 14, 1904.
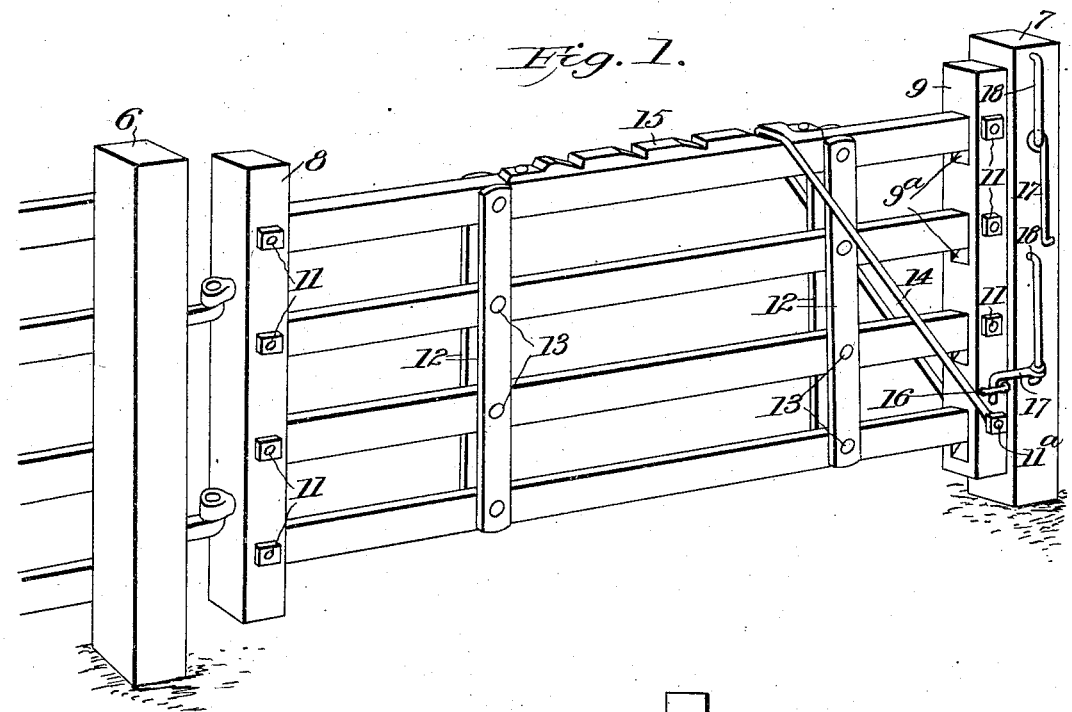
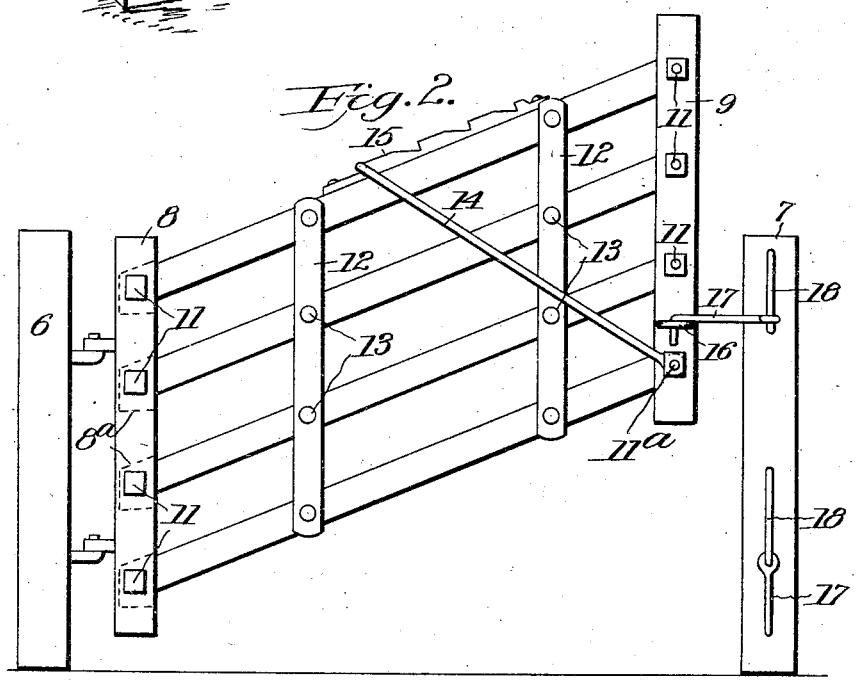
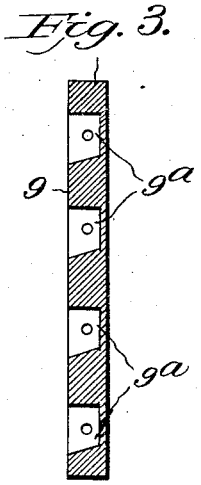
WITNESSES:
C. H. Walker,
Geo. E. Tew
INVENTOR
Thomas W. Howard
BY
Milo B. Stevens & Co.
Attorneys No. 788,316. Patented April 25, 1905.

UNITED STATES PATENT OFFICE.

THOMAS W. HOWARD, OF WINDOM, MINNESOTA.

GATE.

SPECIFICATION forming part of Letters Patent No. 788,316, dated April 25, 1905.

Application filed March 14, 1904. Serial No. 198,047.

*To all whom it may concern:*

Be it known that I, THOMAS W. HOWARD, a citizen of the United States, residing at Windom, in the county of Cottonwood and State of Minnesota, have invented new and useful Improvements in Gates, of which the following is a specification.

This invention relates particularly to a farm-gate which can be raised or lowered edgewise for the purpose of separating stock, swinging over snowdrifts, and counteracting sagging, and has for its object to provide an improved gate of the kind having also improved means for fastening the same in any position.

In the accompanying drawings, Figure 1 is a perspective view of the gate in normal position. Fig. 2 is a side elevation of the gate raised. Fig. 3 is a sectional view of one of the vertical end bars.

Referring specifically to the drawings, 6 and 7 indicate the gate-posts, respectively. The vertical end bars of the gate are indicated at 8 and 9, the former being the hanging bar, which is hung to the gate-post in an ordinary manner. This bar has recesses or mortises (indicated at $8^a$) to receive the ends of the horizontal rails 10 of the gate. The swinging bar 9 is similarly recessed, as at $9^a$, to receive the other end of the rails, and said rails are fixed to the bars by pivot-bolts 11. Between the end bars the rails are supported and held in place by vertical bars 12, of which there are two pair, the bars of each pair being on opposite sides of the rails, to which they are joined by pivot-bolts 13 extending therethrough. These intermediate bars strengthen the gate and hold the rails in proper position.

The pivotal connections allow the free end of the gate to be raised or lowered, and to hold the same in the position desired a bail 14 is employed. This has eyes at its ends through which a bolt $11^a$ extends near the bottom of the free or swinging bar, and the bail extends thence up over the top bar of the gate in position to engage in one of the notches in a rack 15, secured to the top rail of the gate. When the gate is raised or lowered, the bail is moved to the appropriate notch, which holds the parts as adjusted.

The swinging bar carries a staple 16, adapted to be engaged by one or the other of hooks 17, according to the position of the gate. Said hooks are attached to the gate-post 7 by long staples 18, on which the hooks are slidable vertically. This allows the hooks to be raised or lowered to engage the staple 16 in any position of the gate. Inasmuch as the gate draws away from the post 7 as it is lifted, the upper hook 17 is made longer than the lower, so as to reach across the space. The gate may thus be hooked in any of the positions at which it is set.

By the construction described a strong and rigid gate is produced in a simple manner. The use of single vertical bars recessed or mortised to receive the ends of the rails gives a better appearance than the use of separate bars or boards on opposite sides and also affords a stronger support for the hinges and for the gate-rails.

What I claim as new, and desire to secure by Letters Patent, is—

The combination with the swinging vertically-adjustable gate, of the gate-post, elongated staples arranged vertically on said post, one above the other, and hooks slidable vertically on said staples and arranged to engage the gate, the upper hook being longer than the lower.

In testimony whereof I have signed my name to this specification in the presence of two subscribing witnesses.

THOMAS W. HOWARD.

Witnesses:
 J. G. REDDING,
 L. B. RALPH.